(12) United States Patent
Kunz et al.

(10) Patent No.: US 9,503,440 B2
(45) Date of Patent: Nov. 22, 2016

(54) PERSISTENT PUBLIC MACHINE SETTING

(71) Applicant: Microsoft Corporation, Redmond, WA (US)

(72) Inventors: Michael C. Kunz, Seattle, WA (US); Lynn C. Ayres, Bellevue, WA (US); Trevin M. Chow, Redmond, WA (US); Erren Dusan Lester, Renton, WA (US); Campbell D. Gunn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 14/195,695

(22) Filed: Mar. 3, 2014

(65) Prior Publication Data
US 2014/0181907 A1 Jun. 26, 2014

Related U.S. Application Data

(62) Division of application No. 13/609,794, filed on Sep. 11, 2012, now Pat. No. 8,667,608, which is a division
(Continued)

(51) Int. Cl.
*G06F 15/16* (2006.01)
*H04L 29/06* (2006.01)
*G06Q 10/06* (2012.01)
*G06Q 10/10* (2012.01)
*G06Q 30/06* (2012.01)
(Continued)

(52) U.S. Cl.
CPC ............. *H04L 63/08* (2013.01); *G06Q 10/06* (2013.01); *G06Q 10/10* (2013.01); *G06Q 30/0603* (2013.01); *H04L 41/0803* (2013.01); *H04L 67/02* (2013.01); *H04L 63/168* (2013.01)

(58) Field of Classification Search
USPC ....... 709/200, 218, 223, 224, 246; 726/6, 29
See application file for complete search history.

(56) References Cited

U.S. PATENT DOCUMENTS 6,895,234 B1  5/2005 Laursen et al.
7,051,045 B2  5/2006 Cirinna et al.
(Continued)

OTHER PUBLICATIONS

Apple Computer, Inc., "Safari the Fastest Browser on the MAC—The Best Browser on Any Platform", retrieved on Jul. 8, 2014 at <<https://web.archive.org/web/20040806020450/http://www.apple.com/safari/>>, Aug. 6, 2004, 4 pages.
(Continued)

*Primary Examiner* — El Hadji Sall
(74) *Attorney, Agent, or Firm* — Bryan Webster; Judy Yee; Micky Minhas

(57) ABSTRACT

Disclosed herein are methods for protecting user information on a client device that may have a plurality of users. A user interface with a public machine designation portion is presented to a user prior to the start of the authentication process. The public machine designation removes web service account descriptions and any user specific information stored on the client device. Also, the client device is prevented from storing any new user specific information that is provided to the client device. The public machine designation is a persistent feature that may only be disabled by an affirmative action from the user.

20 Claims, 13 Drawing Sheets

Related U.S. Application Data of application No. 11/276,395, filed on Feb. 27, 2006, now Pat. No. 8,280,979.

(51) Int. Cl.
*H04L 12/24* (2006.01)
*H04L 29/08* (2006.01)

(56) References Cited

U.S. PATENT DOCUMENTS

| | | | |
|---|---|---|---|
| 7,366,795 | B2 | 4/2008 | O'Neil et al. |
| 2002/0056040 | A1 | 5/2002 | Simms |
| 2002/0191032 | A1 | 12/2002 | Brown et al. |
| 2003/0061275 | A1 | 3/2003 | Brown et al. |
| 2003/0208558 | A1 | 11/2003 | Venkatraman et al. |
| 2004/0003190 | A1 | 1/2004 | Childs et al. |
| 2004/0054736 | A1 | 3/2004 | Daniell et al. |
| 2004/0177127 | A1 | 9/2004 | Seraphin |
| 2004/0254976 | A1 | 12/2004 | Malik et al. |
| 2005/0177580 | A1 | 8/2005 | Hilbert et al. |
| 2005/0177731 | A1 | 8/2005 | Torres et al. |
| 2005/0192966 | A1 | 9/2005 | Hilbert et al. |
| 2005/0267954 | A1 | 12/2005 | Lewis et al. |
| 2006/0015742 | A1 | 1/2006 | Camaisa et al. |
| 2006/0015817 | A1 | 1/2006 | Fioretti et al. |
| 2006/0022048 | A1* | 2/2006 | Johnson ............... H04L 69/329 235/462.1 |
| 2006/0026437 | A1 | 2/2006 | Sumio |
| 2006/0168509 | A1 | 7/2006 | Boss et al. |
| 2006/0173974 | A1* | 8/2006 | Tang ..................... H04L 63/029 709/217 |
| 2007/0083908 | A1 | 4/2007 | McCarthy et al. |
| 2007/0204016 | A1 | 8/2007 | Kunz et al. |
| 2007/0204224 | A1 | 8/2007 | Kenagy |

OTHER PUBLICATIONS

Apple Computer, Inc., "Safari RRS Your Desktop is the New Doorstop", Feb. 25, 2006, retrieved on Jul. 8, 2014 at <<https://web.archive.org/web/20060225173409/http://www.apple.com/macosx/features/safari/>>, 4 pages.

The Extended European Search Report mailed Jul. 17, 2014 for European Patent Application No. 07751530.2, 10 pages.

Translated Chinese Office Action mailed Aug. 26, 2011 for Chinese patent application No. 200780006711.8, a counterpart foreign application of U.S. Appl. No. 11/276,395, 6 pages.

Office Action for U.S. Appl. No. 11/276,395, mailed on Dec. 22, 2011, Michael C. Kunz, "Persistent Public Machine Setting", 12 pgs.

Office Action for Indian Patent Application No. 4392/CHENP/2008, a counterpart foreign application of U.S. Pat. No. 8,280,979, mailed Feb. 24, 2016, 2 pages.

* cited by examiner

1200

1202
Output a User Interface having a Portion Selectable to Designate a Client Device as a Public Machine

1204
When the Portion is Selected, Remove a Plurality of User Web Service Account Descriptions Stored For The Client Device

1206
Store a Public Machine Designation in a Browser Readable Object Associated with the Client Device

Fig. 12

PERSISTENT PUBLIC MACHINE SETTING

CROSS REFERENCE TO RELATED PATENT APPLICATIONS

This patent application is a divisional application of, commonly owned U.S. patent application Ser. No. 13/609,794, filed on Sep. 11, 2012, which is a divisional application of commonly owned U.S. patent application Ser. No. 11/276,395, filed on Feb. 27, 2006, now issued as U.S. Pat. No. 8,280,979, the contents of which are incorporated herein by reference.

BACKGROUND

A wide variety of resources (e.g., content and services) are available to users over a network and the number of users accessing the resources is ever increasing. It may beneficial for service providers to provide and for user to receive a customized experience, e.g., presenting users content and services tailored to particular users. Users presented with custom and/or more relevant desired information may gain a sense of familiarity and an enhanced interaction with network resources and providers. Service provider providing such an experience may accordingly be more popular and therefore receive increased business. However, in public and private settings alike, users often share client devices such as desktop computers, handhelds, set-top boxes and so forth to gain access to resources. Therefore, a service provider may not know which user is accessing provided resources and is unable to tailor the experience.

One traditional technique is to have users register and/or subscribe to individual service providers. Further, some service provider resources may be protected such that user may need to be authenticated before access is permitted to the resources. In these cases, a user may gain access to resources by proving identity, such as by having the user supplying credentials (e.g., typing a username and password) when prompted. A service provider may then understand which user is accessing the resources. However, using these traditional techniques each user may need to remember and enter different credentials to access different resources from one or more service provider. In addition, the tailored user experience does not begin until user credentials have been entered and verified. Thus, traditional techniques may not meet service provider and/or user desire for a customized user experience.

SUMMARY

Multiuser web service sign-in techniques are described. In an implementation a web service provider sign-in is provided which presents customized information for multiple users of a client device. A user interface is presented having a plurality of portions each corresponding to a particular user and/or user account with a service provider. Each respective portion is selectable to initiate authentication or sign-in of the user to the corresponding account. Further, each portion may be configured with customized user information corresponding to the respective user, for example user specified graphics or text. Customized information for a plurality of users accessing services of a service provider via the same client device is presented in a user interface prior to the act of signing-in to the service provider.

In another implementation, a persistent public computer setting is described. A default setting may be provided that automatically remembers users accessing service provider accounts on a client device. Selecting the public computer setting will disable the default setting and remove any stored information for users that were previously saved on the client device. Further, the public machine setting may remove user data stored for the client device and while selected prevents the client device from storing user account information for users accessing service provider accounts on a client device. In an instance, the public computer setting may be selected by any user thereby protecting the user's information and account on a shared machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 12 depicts a procedure in an exemplary implementation in which a user interface is output having a portion selectable to designated a client device as a public machine

DETAILED DESCRIPTION

Overview

Figure 1:
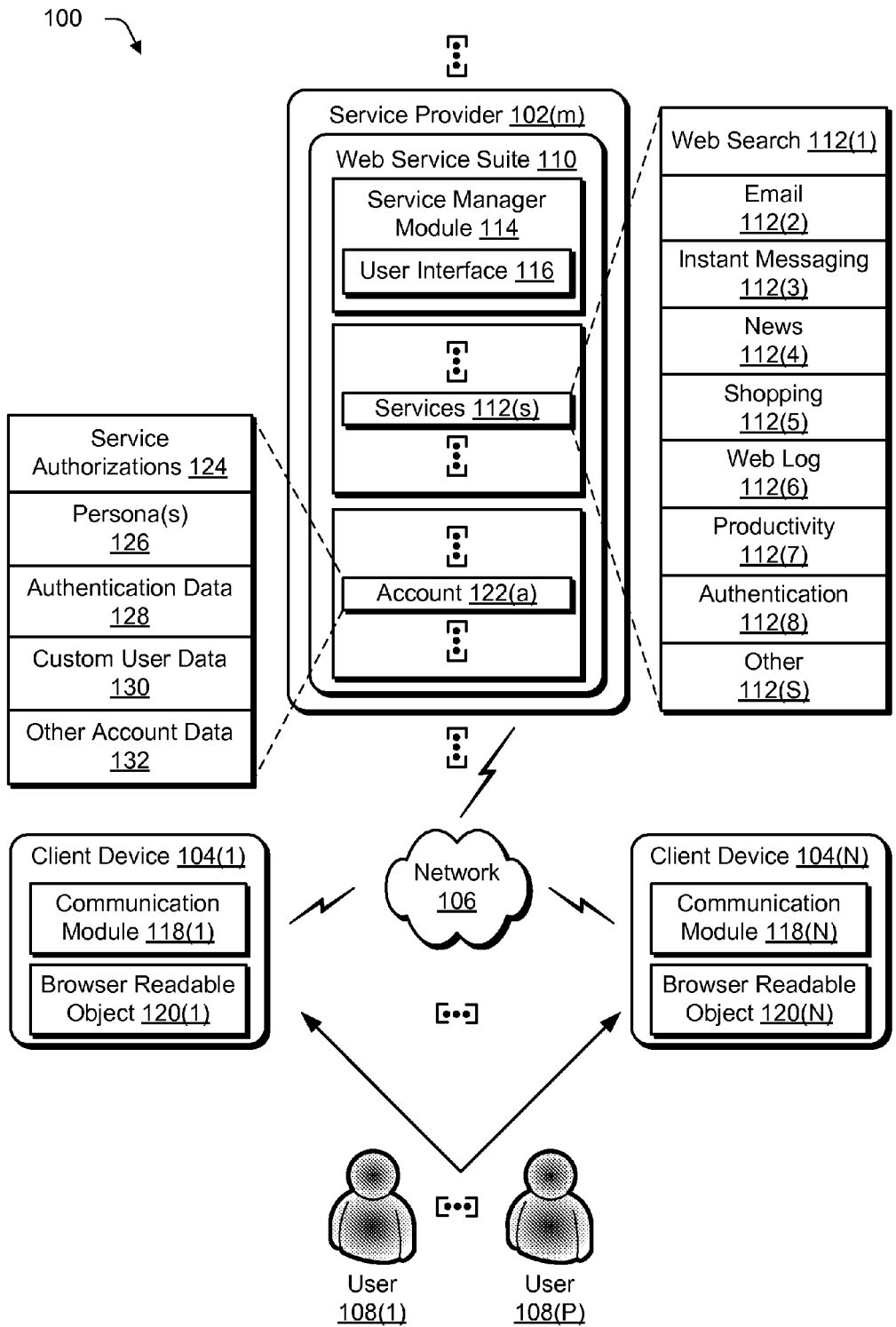
FIG. 1 is an illustration of an environment in an exemplary implementation that is operable to employ multiuser web service sign-in techniques.

A user may use many different client devices such as computers, handheld devices, set-top boxes, and so on to access content via a network. Further users often share these devices. It may beneficial for service providers to provide and for user to receive a customized experience, e.g. presenting users content and services tailored to particular users. Each user of a client device may desire such customized experiences. However, a service provider may not know which user is using a device to access provided resources and is unable to tailor the experience. Further, traditional techniques may be limited to providing a customized experience to a single user after the user sign-ins to an account with a service provider.

Accordingly, multiuser web service sign-in techniques are described in an exemplary implementation, in which a user interface operable to sign on to a web service account is generated which includes information associated with and customized by the user which may be displayed before the actual act of sign-in. For example, a user interface may have portions corresponding to a plurality of accounts for serviceprovider.com, each being associated with respective users. Additionally, the users may have selected custom information, such as a custom graphic, user tile, font, theme and so forth. The custom information may be shown in the portion corresponding to each of the users, for example displaying a customized user tile with each portion. Thus, the plurality of users may each use the same client device and may see their customized information for a web service account in a user-interface prior to sign-in to the user account. The customized information may also allow the users to quickly identify their correct account, e.g. the portion of the interface corresponding to the user's account. Further, the portions may be selectable to provide access to the respective account either by prompting the user to input credentials (e.g., username and password) or directly communicating stored credentials upon selection of the portion.

A user may access web services from a variety of private and public locations. Therefore, a default setting to "remember" user sign-in information (e.g, credentials) for a web service account may be provided on a web service sign-in page. Thus, each client device used to access a user's web service account may remember the user. A multiuser web service sign-in user interface as previously described may thereafter be generated including a portion corresponding to the "remembered" web service account. However, because by default a user will be "remembered" on a client device, this could pose a security threat in publicly used computer setting, such as in a kiosk, computer lab, or computer otherwise shared with others who are not trusted.

Accordingly, in an exemplary implementation, techniques are described for persistent public machine setting. A user of a client device may set the client device as a public machine which will disable the "remember" features on the client device for all users. Further, any user's sign-in, credential data and customized information currently stored for the client device will be cleared. Accordingly, the previously described multiuser web service sign in user interface would be disabled on the particular client device as well. The public machine setting will persist (remain until changed) and could be reversed at a future time.

In the following discussion, an exemplary environment is first described that is operable to employ the multiuser web service sign-in and persistent public machine setting techniques described, as well as other techniques. Exemplary procedures are then described which may be employed by the exemplary environment, as well as in other environments.

Exemplary Environment

FIG. 1 is an illustration of an environment 100 in an exemplary implementation that is operable to employ multiuser web service sign-in and persistent public machine setting techniques. The illustrated environment 100 includes a plurality of service providers 102(m) (where "m" can be any integer from one to "M") and a plurality of client devices 104(1), [ . . . ], 104(N) communicatively coupled over a network 106. A plurality of users 108(1), [ . . . ], 108(P) are depicted as utilizing one or more of the plurality of clients 104 such as to access resources (e.g., services and content) from the service providers 102(m). In other words, multiple users 108 may use the same client device 104 to access the network 106, e.g., the internet.

The plurality of client devices 104 may be configured in a variety of ways for accessing the service provider 102(m). For example, one or more of the client devices 104 may be configured as a computing device, such as a desktop computer, a mobile station, an entertainment appliance, a set-top box communicatively coupled to a display device, a wireless phone, a game console, and so forth. Thus, the client devices 104 may range from full resource devices with substantial memory and processor resources (e.g., personal computers, game consoles) to low-resource devices with limited memory, processing and/or display resources (e.g., traditional set-top boxes, hand-held game consoles, wireless phones). In other words, one or more of the client devices 104(n) may describe logical clients that include software and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 108 is shown, the network 108 may be configured to include multiple networks.

One or more of service providers 102(m) may be configured as a provider of a web service suite 110 as illustrated in FIG. 1. The web service suite 110 integrates a plurality of services 112(s) (where "s" can be any integer from one to "S") that are accessible via the network 106. Thus, the web service suite 110 provides a full suite of services rather than individual or only a limited number of services. In an implementation, a user registers (e.g. "signs-up") a single time with the web service suite 110 and is provided access to all of the services of the suite during a session. The user has access to all of the services 112(s) whether the user actually uses the services 112(s) or not, and need not register individually for each different desired services 112(s). A user 108 may simply select one service 112 and then any additional service 112(s) provided by the suite 110 without requiring the user 108 to provide additional credentials. In effect, the user 108 turns on the full suite of services 112(s) upon registration with the web service suite 110. While a service provider 102(m) configured to provide a web service suite 110 has been described, it is contemplated that service providers 102(m) may range from those providing a single service 112(2) (e.g., as an email provider) up to a provider of a full suite of services 112(s). The techniques and procedures described herein may be used by users 108 accessing resources (e.g. content and services) from one or more of the plurality of service providers 102(m).

The services 112(s) may be configured in a variety of ways to provide functionality over the network 106 to the client devices 104. For example, the services 112(s) may be configured for access via platform-independent protocols and standards to exchange data over the network 106. The services 112(s), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A wide functionality may be made available via the web service suite 110. For example, plurality of services 112(s) may include a web search 112(1) service (e.g., a search engine) provided to search the Internet, an email 112(2) service provided to send and receive email, and an instant messaging 112(3) to provide instant messaging between the clients 104(n). Additional examples include a news 112(4) service, a shopping (e.g., "ecommerce") 112(5) service and a web log 112(6) service. Further, productivity 112(7) services may also be provided, such as word processing, spreadsheets, presentations, drawings, note-taking, and so on. For instance, network access may be given to one or more of client devices 104 to applications that were traditionally executed locally on the client devices 104. Therefore, execution of the application modules may be performed remotely at the service provider 102(m) and results of the execution may be communicated over the network 106 to one or more of the client devices 104. An authentication service 112(8) may also be provided to authenticate client devices 104 to access other services, which may include other services provided by the service provider 102(m) as well as other services provided by other service providers. Although a few examples of services have been described, it should be apparent that a wide variety of other 112(s) services are also contemplated.

The service provider 102(m) is also illustrated as having a service manager module 114, which is representative of functionality used by the service provider 102(m) to manage access to the services 112(s) over the network 106, performance of the services 112(s), and so on. Although illustrated separately, the functionality represented by the service manager module 114 may be incorporated within the services 112(s) themselves.

The service manager module 114, for instance, may be utilized to generate a user interface 116 that is provided over the network 106 to a client device 104 to enable the client device 104 to interact with the services 112(s). For example, the user interface 116 may be output through use of communication modules 118(n) that is executable on the client devices 104 to render the user interface 116, and more particularly data used to form the user interface. Client devices 104 are further depicted as each having a respective browser readable object 120(1), [ . . . ] 120(N). One or more browser readable object 120 associated with a client device 104 may store information corresponding to a plurality of users 108 which may be incorporated in the rendering of a user interface 116. Data corresponding to a plurality of users 108 of a client device 104 may then be retrieved from the one or more browser readable object 120 and used to generate a user interface 116. In this manner, an interface having custom information corresponding to a plurality of users 108 may be output prior to the users 108 actually signing-in, further discussion of which may be found in relation to FIGS. 2 to 7.

Additionally, the service manager module 114 may manage a plurality of accounts 122(a) (where "a" can be any integer from one to "A"), each of which represents data that is utilized for interaction by the client devices 104 with the plurality of service 108(s). For example, the account 122(a) may correspond to a particular user 108 and include service authorizations 124 which indicate the services 112(s), with which, the user 108 is permitted to interact. Naturally, in the case of a web service suite service 110 authorizations 124 may permit access to the full suite of services 112(s) as previously discussed. The particular user 108 may also access a corresponding account 122(a) from more than one of the plurality of clients 104. Further, a plurality of users 108 may access respective accounts 122(a) from the same client device 104

The account 122(a) may also include one or more persona(s) 126 of a user 108, which are used to provide different external representations of the user 108. For instance, a "work" persona may be utilized by the user 108 for interactions related to work (e.g., work email and instant messaging) and a "personal" persona may be used to interact with family and friends. Each persona may provide a different external representation for how other users "see" the particular user, such as a different email address, user tile, and so on. The account 122(a) may also include authentication data 128 (e.g., name and password) that is used to authenticate the user's 108 identity. A wide variety of other customized user data 130 associated with an account 122 is also contemplated, such as personalized emoticons, user tiles, audio files, texts, color selections, video, animations and so on. The customized user data may be incorporated in a multi-user web service sign-in interface further discussion of which may be found in relation to FIGS. 2-7. A variety of other account data 132 is also contemplated such as user profiles, billing data, and any other data related to interaction of a user 108 with a service provider 120 and account 122.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the multi-user web based sign-in techniques described below are platform-independent, meaning that the techniques may be implemented on a variety of commercial computing platforms having a variety of processors.

Multi-User Web Based Sign-in

Figure 2:
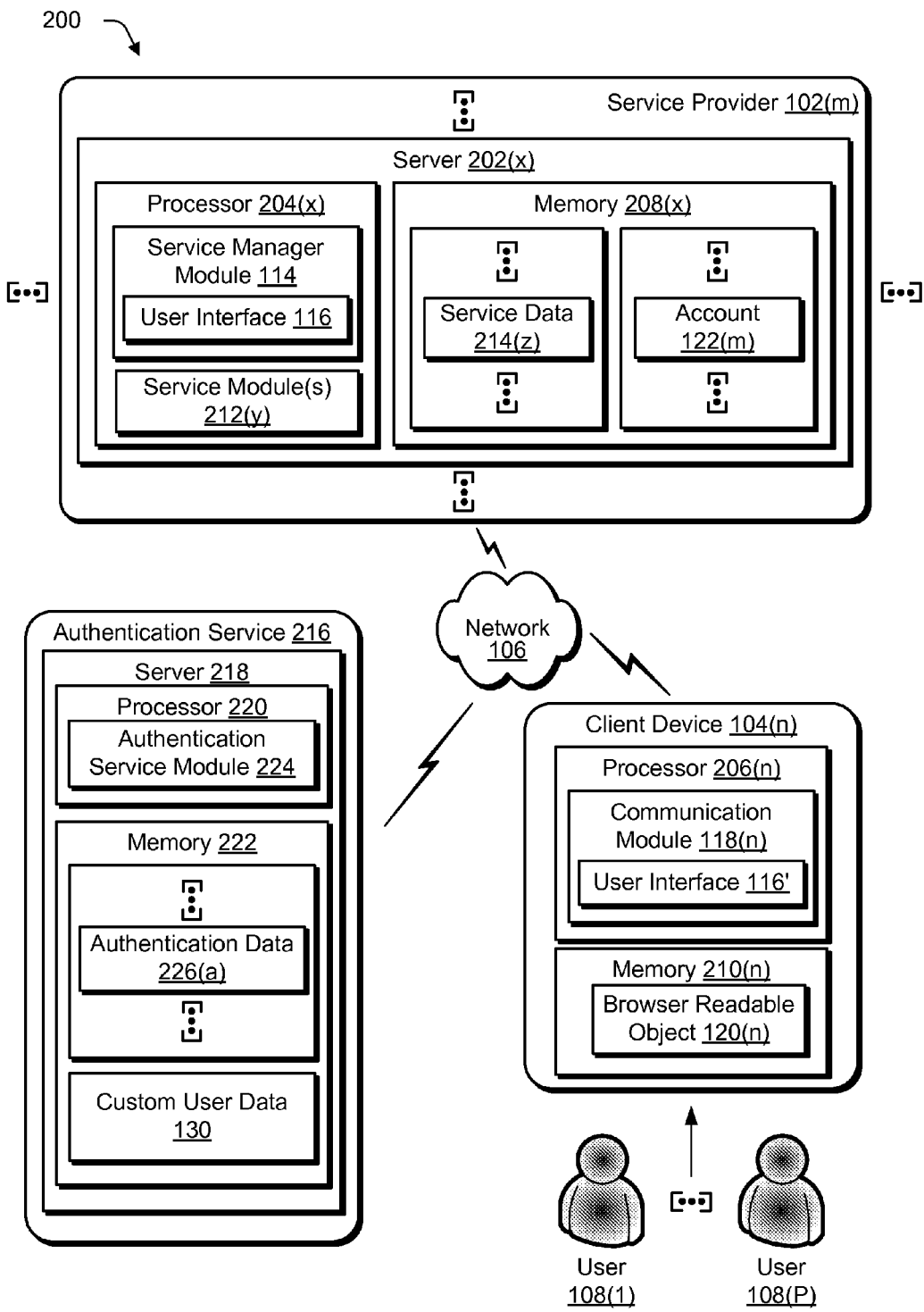
FIG. 2 is an illustration of a system in an exemplary implementation showing a service provider and client of FIG. 1 in greater detail.

FIG. 2 is an illustration of a system 200 in an exemplary implementation showing a service provider 102(m) and a client device 104(n) of FIG. 1 in greater detail. Client device 104(n) may be any of client devices 104(1)-104(N) depicted in FIG. 1. In FIG. 2, the service provider 102(m) is illustrated as being implemented by a plurality of servers 202(x) (where "x" can be any integer from one to "X") and the client 104(n) is illustrated as a client device.

The server 202(x) and the client 104(n) each include a respective processor 204(x), 206(n) and respective memory 208(x), 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(x), 210 (n) is shown, respectively, for the server 202(x) and the client 104(n), a wide variety of types and combinations of memory may be employed, such as random access memory (RAM), hard disk memory, removable medium memory, and other computer-readable media.

As previously described, the services 112(s) of FIG. 1 may be configured in a variety of ways to provide functionality over the network 106 to the client 104(n). For example, the services 108(s) may be provided via one or more service module(s) 212(y), which are illustrated as being executed on the processor 204(x) and are storable in memory 208(x). The service modules(s) 212(y) in this instance are configured as an Internet-hosted module that is accessed via standardized network protocols. The service module(s) 212(y), when executed, may also use respective service data 214(z) to provide corresponding functionality. For example, service module 212(y) may be configured as an Internet search module (e.g., a search engine) that examines service data 214(z) configured as an indexed search database to provide Internet searches. A variety of other examples are also contemplated.

Additionally, a service may also be provided as a stand-alone service. For example, an authentication service 216 may be provided by a server 218 configured for network 106 access and that has a processor 220 and memory 222. The authentication service 216 includes an authentication service module 224 that is executable on the processor 220 to authenticate the user 108 using authentication data 226(a), where "a" can be any integer from one to "A". For instance, the user 108 may provide a name and password which is authenticated by the authentication service module 224 using the authentication data 226(a). When the authentication is successful (i.e., the client 104(n) "is who they say they are"), the authentication service module 224 may pass a token to the client 104(n) that is used by the client to access services 110(s) of the service provider 102(m). The token may also be used to access other services by other service providers such that the client 104(n) is not forced to re-authenticate to access each of the plurality of service providers 102(m). It should be apparent that other examples are also contemplated.

The service manager module 114 is also illustrated as being executed on the processor 204(x) and is storable in memory 208(x) of the server 202(x). As previously described, the service manager module 114 is representative of functionality that manages interaction of the client 104(n) with the plurality of services 112(s) of FIG. 1, which are implemented by the service module(s) 212(y) and service data 214(z) of FIG. 2. For instance, the service manager module 114 may provide data sufficient to form a user interface 116. This data may be communicated over the network 106 to the client 104(n) and used by the communication module 118(n) (which is illustrated as being executed on the processor 206(n) and is storable in memory 210(n)) to output user interface 116'.

It is noted that user interface 116' may be generated to provide a customized sign-in experience to a plurality of users 108 for signing-in or authenticating to one or more service provider 102(m). For instance, user interface 116' may have a plurality of portions each corresponding to a respective user 108 and/or account 122. Each portion may be selectable to cause authentication of the respective user to a corresponding account 122 thereby permitting the user to access resources of the service provider 102(m). Authentication data 226 (e.g., user credentials) such as user names and passwords for the plurality of users 108(p) and/or accounts may be stored in a variety of locations for instance., on a client device 104, at authentication service 216, associated with an account 122 at a service provider 102, and so forth. Authentication data 226 may be accessible upon selection of the corresponding portion via a common user interface 116'. Further, user interface 116' may incorporate other custom user data 130 such as a particular user tiles (e.g., user selected icon), animations, account data, alias, personas, sound, text, video, themes, colors and so forth for each selectable portion. Thus, user interface 116' may be generated on a client device 104 having customized portions for each of a plurality of users or accounts of users, further discussion of which may be found in relation to FIGS. 3-7. It is noted that customized user data 130 may be accessible to a client 104(n) from a variety of locations. For instance, custom user data 130 is depicted as stored within memory 222 of authentication service 216 and is accessible via network 106. While customized user data 130 with authentication service 216 in FIG. 2, alternatively customized user data 130 may be stored on client device 104(n), at a service provider 102 and so forth.

FIG. 2 depicts client device 104(n) as having a browser readable object 120(n). In an implementation, one or more browser readable object (BRO) 120 (which is illustrated as storable in memory 210(n) of client device 104(n)) may be utilized to obtain user specific information for use in generating a user interface 116'. While the BRO 120 is depicted in memory on client device 104(n), it is noted that a BRO may be located remotely and retrievable via network 106. For instance, communication module 118(n) may incorporate browser functionality and be configured to retrieve one or more BRO 120 associated with that particular client device 104(n) when browser of that device is directed to service provider 102(m).

BRO 120(n) may be configured in a variety of ways to facilitate generating multi-user web service sign-in user interface 116'. In an instance, the BRO 120 itself holds the authentication data 226 and/or customized user data 130, e.g., usernames, passwords, graphics, and so forth. Alternatively, BRO 120 identifies one or more users and locations where authentication data 226 and/or customized user data 130 for respective users is stored and may be obtained. The storage location may be local (e.g., on client device 104(n)) or a remote location accessible via network 106, such as at authentication service 216. Thus, user interface 116' may be generated locally on client 104(n) using the BRO 120(n) stored locally and without accessing remotely stored data, or BRO 120(n) may be used in combination with information stored locally and/or remotely to produce user interface 116'. A variety of combinations are contemplated in which one or more BRO 120 is utilized to obtain combinations of locally and remotely stored authentication data 226 and customized user data 130 corresponding to a plurality of users.

In an instance, a user interface 116 may be available, for example, from service manager module 114. User interface 116 may be a default or template interface having placeholders for customized user data 130 corresponding to a plurality of users. Client 104(n) may download the template user interface 116 and use one or more browser readable objects 120 to customized user data 130 to the default interface 116. The browser readable object 120(n) may identify user customized user data 130 for a plurality of users to fill in the template and generate user interface 116'.

In another implementation, the user interface 116 may be generated remotely already including the customized user data 130 for one or more users 108. For example, communication module 118(n) of client 104(n) may communicate a locally stored BRO 120(n) when service provider 102(m) is accessed. User interface 116 may then be generated by service manager module 116 which incorporates the customized user data 130 identified by received BRO 120(n). User interface 116 may be returned to client 104(n) for output as user interface 116'. Thus, in this implementation, remotely generated user interface 116 and 116' may be the same.

Thus, a multiuser web service sign-on user interface 116' may be provided having a plurality of portions customized respectively to multiple-users. A multi-user web service sign-in user interface 116' may be configured in a variety of ways to provide sign-in interaction, further discussion of which may be found in relation to the following FIGS. 3-5.

Figure 3:
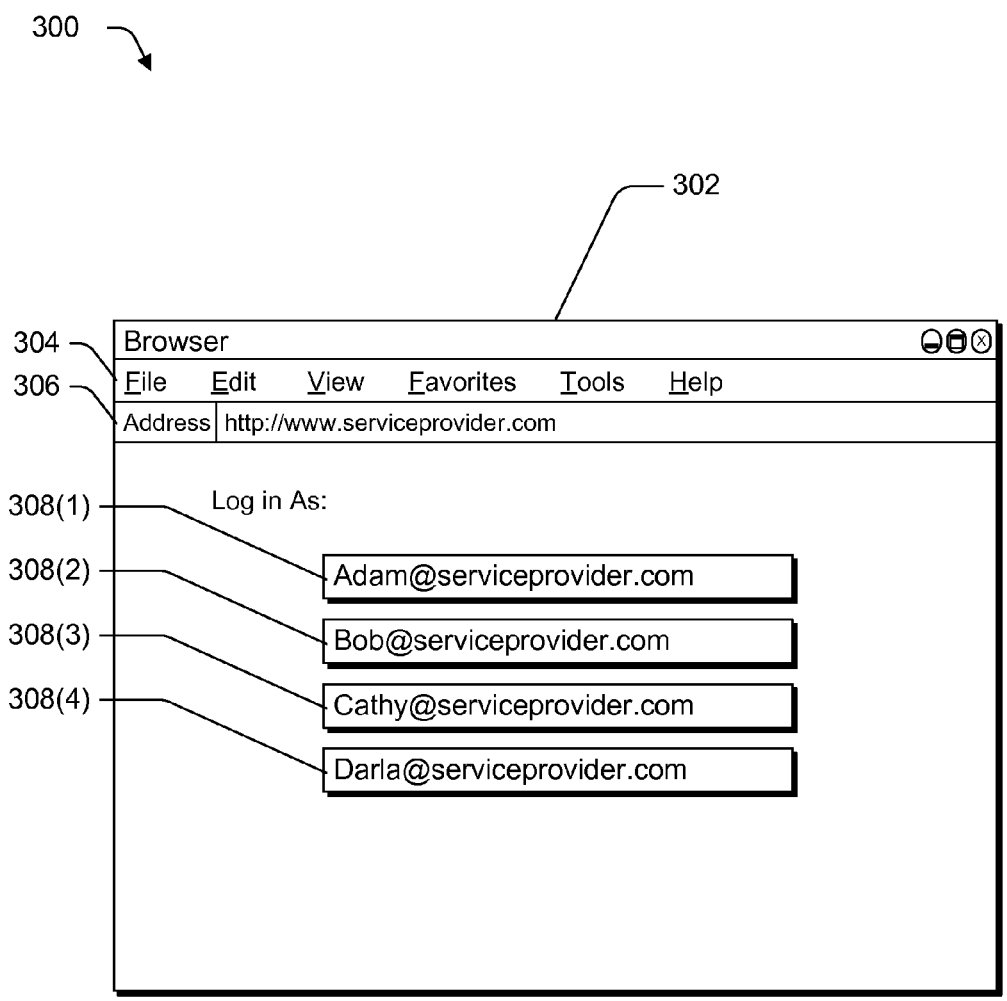
FIG. 3 is an illustration of an exemplary implementation showing the client of FIG. 1 as rendering a user interface of FIG. 2.

FIG. 3 illustrates an exemplary implementation 300 of the user interface 116' of FIG. 2. The user interface 116' provided of FIG. 2 in this instance is illustrated as incorporated within a user interface 302 provided by the communication module 118(n). For instance, communication module 118(n) may be configured to provide a browser as depicted in FIG. 3 and having a menu bar 304 and an address bar 306. The menu bar 304 is a portion of the user interface 302 that includes drop-down menus of commands, examples of which are illustrated as "file", "edit", "favorites", "tools" and "help". The address bar 306 is configured to receive inputs to navigate to particular network addresses and/or display current network addresses, from which, the client 104(n) has received content and is being displayed.

User interface 116', incorporated within user interface 302, includes a plurality of portions 308(1)-308(4) which each correspond respectively to one of a plurality of users 108, in the illustrated example Adam, Bob, Cathy and Darla. Naturally, the number of users 108 shown is exemplary and may accordingly be increased or decreased to accommodate different numbers of users 108 of a particular client device 104(n). Each user 108 may have an account 122 with a service provider 102 which is accessed via the same client device 104(n), and specifically via user interface 116'. In particular, a user 108 may select a corresponding portion 308 which causes authentication and accordingly access to a corresponding account 122. The portions 308 corresponding to each user are simultaneously displayed. In this manner each user (Adam, Bob, Cathy, and Darla) receives a customized sign-in experience and may access their particular account(s) 122 from the initially displayed interface 116'.

The first time users 108 uses a client device 104(n), the users may indicate if they would like information to be remembered on the client device 104(n). In an implementation, users 108 may be remembered by default. It is noted that a particular user 108 may be remembered on numerous client devices 104 such that the particular user 108 receives a customized sign-in on each of the client devices 104. Thereafter, a customized portion 308 corresponding to the particular user 108 and/or user account 122 will be included in the rendering of user interface 116'. User may select the portion 308 to access the respective account 122, e.g., to "sign-in" or authenticate to the service provider 102 providing the account 122.

In the depiction of FIG. 3 for example, each portion 308 includes an identification of a particular account such as portion 308(1) which identifies "Adam@serviceprovider.com". Thus, portion 308(1) is selectable to cause authentication or sign-on to the account "Adam@serviceprovider.com". As previously described, the customized user data 130 incorporated in user interface 116' may be retrieved utilizing one or more BRO 120. For example, a BRO associated with a client device 104(n) may included a list of the users 108 of that device (e.g. Adam, Bob, Cathy and Darla) and customized user data 130 such as the account name, username, tiles, graphics, colors or themes, emoticons, animations, video, audio and so forth. Each of the portions 308 may be configured in a variety of ways, for instance, including various combinations of controls (such as a buttons, selection boxes and so forth etc), selectable text, audio, colors and themes, pictures or other images and/or other combinations of text and graphics. Naturally, one or more BRO 120 may also identify customized user data 130 to be included in the interface 116' that may then be retrieved locally on the client device 104 or remotely on a server such as service provider site 102, authentication server 216 and so on. Further discussion, of arrangements of customized user portions 308 may be found in relation to FIGS. 4-5.

Figure 4:
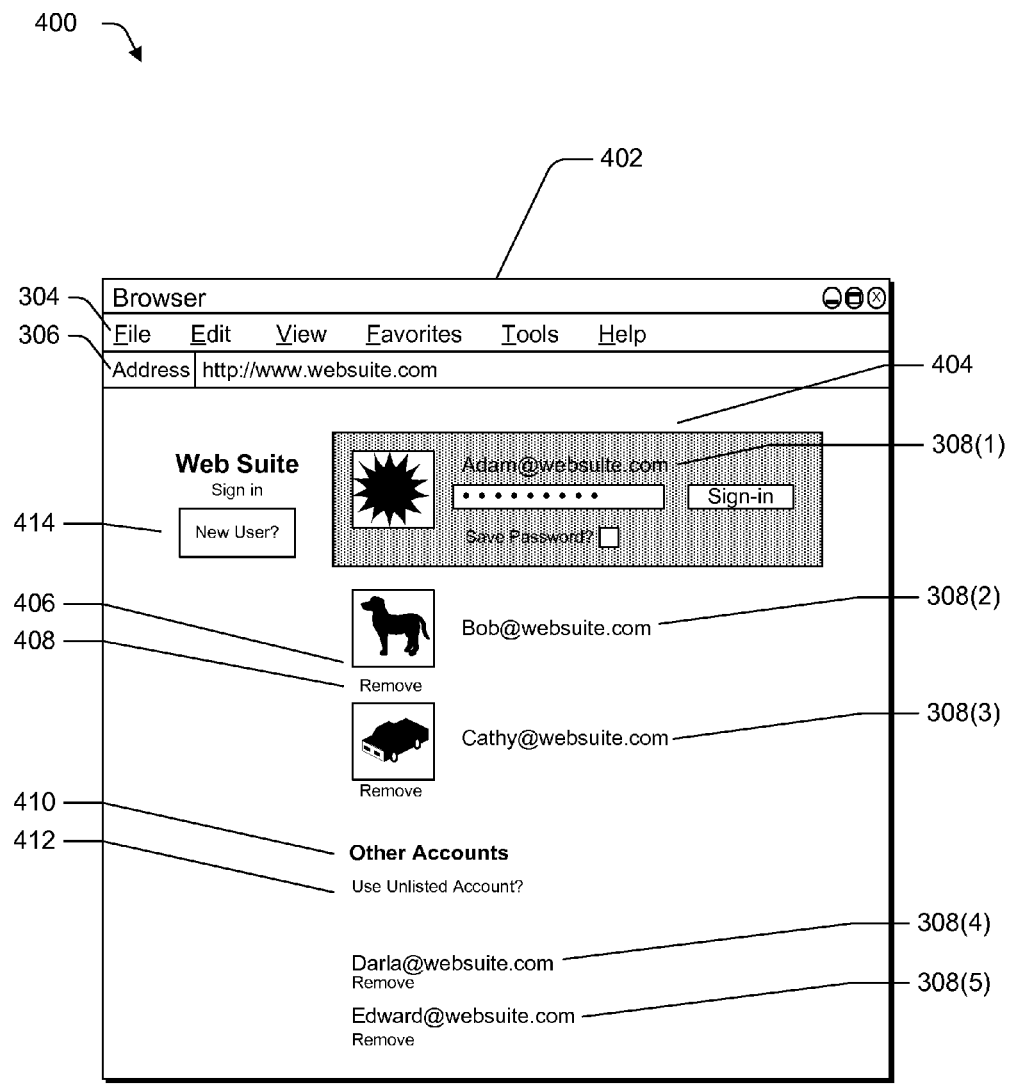
FIG. 4 is another illustration of an exemplary implementation showing the client of FIG. 1 as rendering the user interface of FIG. 2.

FIG. 4 illustrates another exemplary implementation 400 of the user interface 116' of FIG. 2. Again, the user interface 116' of FIG. 2 in this instance is illustrated as incorporated within a user interface 402 provided by the communication module 118(n). The user interface 116' in FIG. 2 depicts a variety of additional features and examples of customized user data 130 which may be utilized alone or in various combinations to provide user interface 116' having a plurality of customized portions 308 corresponding to multiple users 108 of a client device 104.

In this case, address bar 306 shows browser directed to a service provider 102 specifically "websuite.com". Web suite.com may be configured to provide a suite of services as previously discussed with respect to FIG. 1. A plurality of portions 308(1)-308(5) is depicted each corresponding to a one of a plurality of users 108 (e.g., Adam, Bob, Cathy, Darla, Edward).

Interface 116' may have a highlight region 404 which indicates the currently active or selected portion, in this case portion 308(1) corresponding to user Adam and an account "Adam@websuite.com". A portion 308, when in the highlighted may be expanded to include additional customized user data 130. For instance, in FIG. 4 portion 308(1) is depicted having a password input box to for a user to enter a password associated with Adam@websuite.com, a sign-in button, and an option to save the password. Adam, for example may have previously elected not to have his password remembered.

Figure 5:
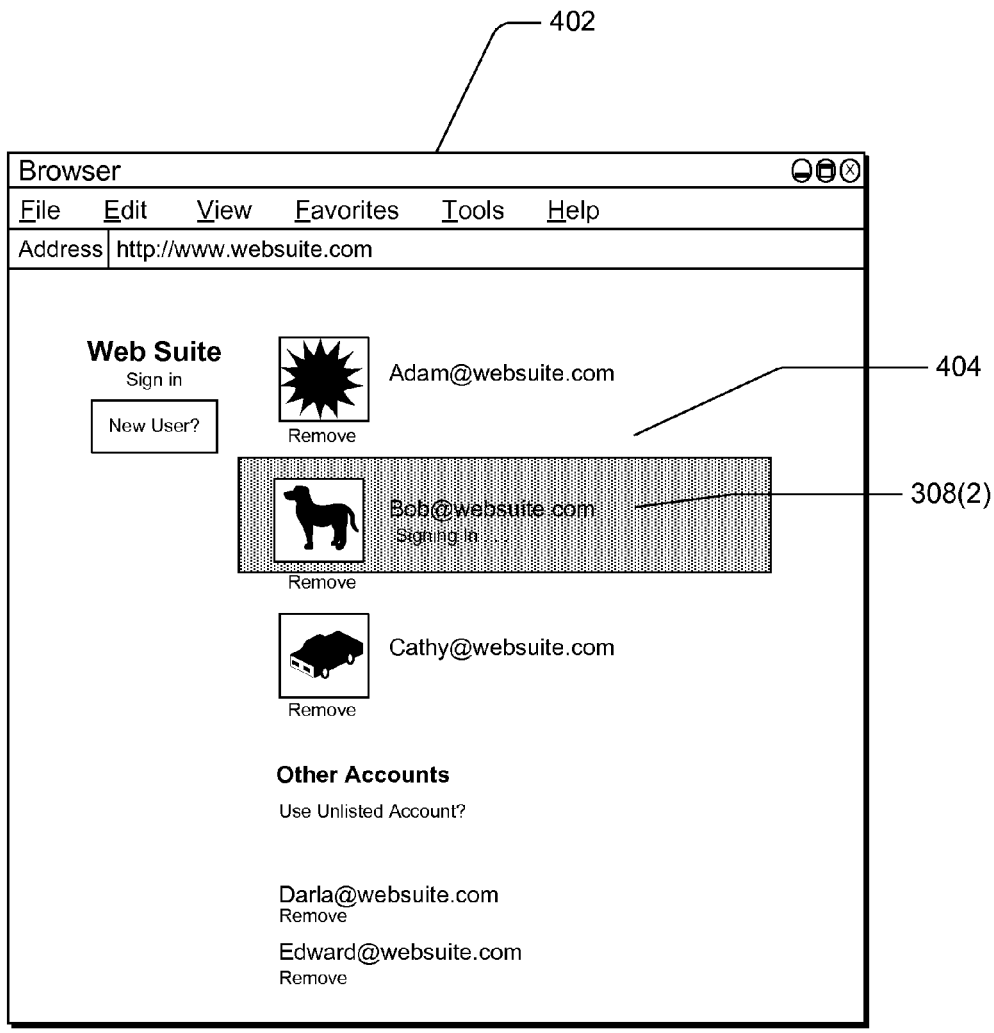
FIG. 5 is still another illustration of an exemplary implementation showing additional features of the user interface depicted in FIG. 4.

A variety of expanded options are contemplated. In an instance, a user 108 may elect to save password, username and/or other credentials (e.g. authentication data 226) such that authentication is initiated without needing to reenter this information, e.g., authentication occurs upon selection of the portion 308 corresponding to the account without the user 108 entering any user credentials. Referring to FIG. 5, for instance, the interface 402 of FIG. 4 is now depicted with the highlight region 404 associated with user Bob and an account "Bob@websuite.com". In this instance, Bob has previously chosen to have account sign-in information remembered. Accordingly, portion 308(2) is selectable, such as by a single click, to immediately begin authentication to "Bob@websuite.com". An indication, such as "signing in" as shown in FIG. 5, may optionally be provided.

Referring back to FIG. 4, each portion 308 may further include an associated image or user tile 406. The associated image or user tile 406 is an example of the customized user data 130 previously described. The user tile 406 is selectable for instance at the time a user 108 initially registers for a service provider 102. Each portion 308 may have a different respective tile 406 corresponding to a particular user 108, for example the sun, dog, and car associated respectively with Adam, Bob and Cathy in FIG. 4. Naturally, tiles may be omitted or a default tile may be provided in the absence of a user selection.

Portions 308 may be configured to include a variety of other customized user data 130 such as customized animation, video, audio and so forth. In addition the user tiles 406 may incorporate animation, video, and/or audio. Selecting or highlighting a particular portion 308, for example, may cause playback of a user specific video clip, animation, audio clip and so on included with the user tile 406 or otherwise associated with the portion 308. Again, the user tile 406 or other customized user data 120 such as text, sound, and graphics may be stored locally or remotely and are accessible via a BRO 120 to be included in an interface 116' as previously described. A user 108 may select a variety of customized user data 130 at the time user 108 initially registers for a service provider 102, and may update the information by accessing their respective account 122 via a client device 104(n). In an implementation, a BRO 120 associated with the client device 104(n) which indicates customized user data 130 may correspondingly be updated to reflect any changes.

Each portion 308 may also include a remove option 408 to remove a corresponding user/account from the plurality of accounts 122(m) in the user interface 116'. For instance, portion 308(2) is depicted having an associated remove option 408 configured as text "Remove" which is selectable to remove the account 122 Bob@websuite.com from the interface 116'. The remove option 408 may be configured as selectable text, a button, check box and so forth which is selectable to remove the particular portion 308 from the user interface 116'. In an implementation, the selection of the remove option 408 causes an associated BRO 120 to be updated (e.g., remove data corresponding to the particular account 122) to remove the account 122 from subsequent displays of interface 116'.

User interface 116' may further provide different levels and/or types of customized user data 130 for different portions 308. Some portions 308(1)-308(3) may provide more detailed information (e.g., includes user tiles 406) than others 308(4)-308(5) which in FIG. 4 are shown having less information (e.g., listing the account name without a tile). It may be appreciated that the most often or recently used accounts may be have a portion 308 included in a detailed fashion while other accounts used less frequently may be presented in portions 308 having less data. The number of accounts shown in a detailed or limited fashion may be configurable. This permits the available display area to be managed while permitting a higher number of user accounts to be included in the interface 116'. The portions 308 of different detail may be arranged in a variety of ways, such as having portions with similar detail arranged together. FIG. 4 for example depicts more detailed portions (308(1)-308(3)) arranged above an other accounts area 410 where portions 308(4)-308(5) having less detail are arranged. A variety of other arrangements are also contemplated.

An unlisted account option 412 may also be provided which may be selectable by a user 108 to access an unlisted account. For example, if Fred has an account with websuite.com but has not previously used the particular client device 104(n), was not remembered, or has been removed, a portion 308 corresponding to Fred's account will not appear in the interface 116'. Thus, Fred may access his existing account via the unlisted account option 412. Similarly, a new user option 414 may be provided which is selectable by a user 108 to initially register with a service provider 102 such as websuite.com. In the process of accessing an unlisted account via unlisted account option 412 or a new account via new user option 414, the user may be remembered on the client 104. Thus, subsequently user interface 116' would include a portion 308 corresponding to the user/account.

Exemplary Procedures

The following discussion describes multiuser web based sign-on techniques that may be implemented utilizing the previously described systems, interfaces, and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 6:
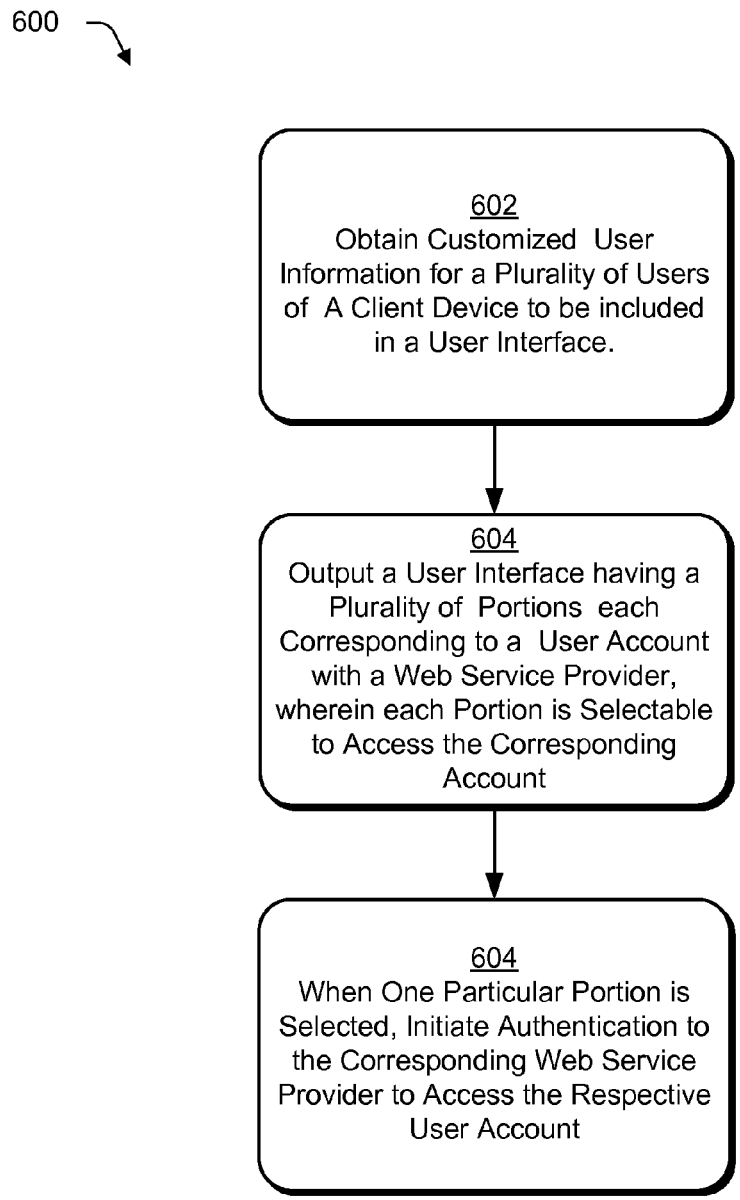
FIG. 6 depicts a procedure in an exemplary implementation in which a user interface operable by a plurality of users to access one or more web service account is output.

FIG. 6 depicts a procedure 600 in an exemplary implementation in which a user interface operable by a plurality of users to access one or more web service account is output. Customized user information for inclusion in a user interface is obtained for a plurality of users of a client device (block 602). For example a plurality of users 108 of FIG. 2 may access a plurality of web service accounts 122 via client device 104(n). If, by default or user selection, the accounts 122 are "remembered" on the client device 104(n), then customized user data 130 associated with the accounts 122 may be stored in a variety of locations, such as in memory on the client device 104(n) or remotely on a server accessible to the client device 104(n). Thus, client device 104(n) may obtain the customized information, for example, via communication module 118(n), which is configured to retrieve the customized user data 130 locally on the client device 104(n) or via network 106. Customized user data 130 obtained may be configured in a variety of ways, such as including any of, user tiles, icons, animations, audio, graphics, account names, colors, themes, video, alias, user name and so forth. The obtained customized information may then be included in a user interface, such as user interface 116' depicted within communication module 118(n) in FIG. 2.

A user interface is output having a plurality of portions, each corresponding to a user account with a web service provider. Each portion is selectable to provide access to the corresponding account (block 604). For instance, communication module 118(n) in the previous example may output user interface 116' including the plurality of customized user data 130 within a browser interface 402 as depicted in FIG. 4. The browser is directed to a service provider "websuite.com". A plurality of users accounts 122 are simultaneously displayed in respective portions 308(1)-308(5). Here, accounts corresponding to a plurality of users Adam, Bob, Cathy, Darla, and Edward are depicted. Customized user data 130 is incorporated into the portions 308 depicted in FIG. 4, such as user tiles 406 and user account names (i.e., Adam@websuite.com). A variety of other customized user data 130 is contemplated as previously described. A user may select a portion 308 to provide access to a corresponding account. While each portion in this instance corresponds to an account with websuite.com, it is contemplated that portions 308 corresponding to different respective service providers 102 may be included in the same interface 116'

When a particular portion is selected, authentication is initiated to the corresponding web service provider to access the respective user account. In an example, a user 108 selects portion 308(1) of FIG. 4 which corresponds to Adam@websuite.com. A password input as depicted in FIG. field may be exposed if the password associated with Adam@websuite.com has not been remembered. A user 108 may then enter the password and sign-in to Adam@websuite.com. In another example, a password associated with an account may be remembered and selecting the portion 308 causes a direct sign-in to the associated account. Thus, a portion 308 may be selectable to cause user credentials (e.g., authentication data 122, password, proof of ID, and so on) to be communicated via network to provide access to a corresponding account. For instance, in FIG. 5 a portion 308(2) associated with Bob@websuite.com is depicted as selected. A user 108 may previously have chosen to have the password associated with Bob@websuite.com remembered. Thus FIG. 5 depicts a direct sign in to the service upon selection of portion 308(2) without reentering authentication credentials. In an implementation, an indication such as "Signing-in" may be provided.

Figure 7:
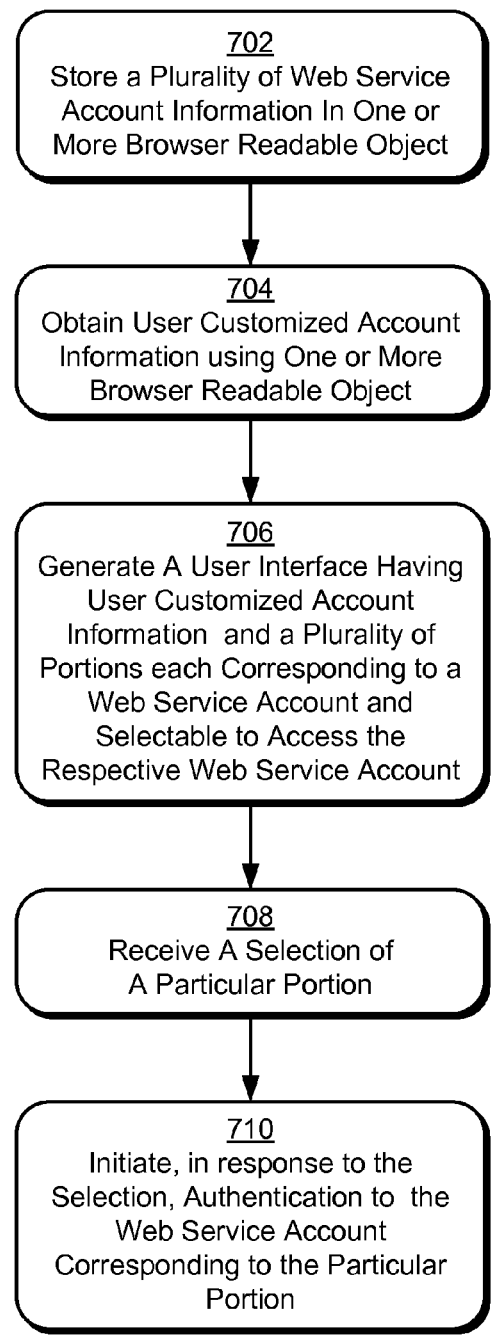
FIG. 7 depicts a procedure in an exemplary implementation in which one or more browser readable object stores web service account information which is used to generate a multiuser web service sign-in interface.

FIG. 7 depicts a procedure 700 in an exemplary implementation in which one or more browser readable objects store web service account information which is used to generate a multiuser web service sign-in interface. Information describing a plurality of web service accounts is stored as one or more browser readable object (BRO) (block 702). For instance, browser readable object 120 depicted in memory 210(n) of client 104(n) in FIG. 2 may store information identifying a plurality of web service accounts 122, users of the accounts, and/or authentication data 122 and customized user data 130 associated with the accounts 122. When a user 108 initially signs up for a web service account 122, such as with service provider 102(m), a BRO 120 may be generated or updated to include web service account information associated with the account 122. User 108 may later access the account and update account information which will correspondingly result in updating the associated BRO 120.

One or more browser readable objects are used to obtain user customized account information (block 704). BRO 120 of the previous example may be used alone or along with other BROs 120 to obtain credentials and customized user data 130 for the web service accounts 122 described in the BROs 120. For example, communication module 118(n) of FIG. 2 may be configured to retrieve a BRO 120 and obtain customized user data 130 described in the BRO, and associated with a plurality of web service accounts 122(m). Customized user data 130 may include a variety of items a previously described such as account names, user tiles, audio, video, color themes, icons, picture, text, animations and so on. The BRO 120 may directly store the customized user data 130 or may describe a local or network location where the information may be obtained. Further, it should be appreciated that while a BRO 120(n) is depicted in FIG. 2 on a client device 104(n), one or more BRO 120 may be located remotely and accessible via network 106 such as at a service provider site 102, authentication service 216 and so on.

A user interface is generated having user customized account information, and a plurality of portions each corresponding to a web service account and selectable to access the respective web service account (block 706). For example, a user interface as depicted in FIG. 3 may be generated. Portions 308(1)-308(4) of FIG. 3 each correspond to an account with a web service, serviceprovider.com. The portions may further include respective user customized account information, such as a user name or alias, a particular color or theme, an icon, associated audio, and so forth. For example, the color of portions 308(1) and 308(2) in FIG. 3 may be different based upon customized account information associated with each portion. Thus, customized user data 130 may be displayed in a user interface prior to actual sign-on to the web service. Further a plurality of users may each be presented with customized user data 130 corresponding to accounts of the users prior to actual sign-in. Each user using a particular client device 104(n) to access a web service accordingly receives a customized sign-in experience.

A selection is received of a particular portion (block 708). For instance, a particular one of the portions 308(1)-308(4) in the user interface depicted in FIG. 3 may be selected. In response to the selection, authentication is initiated to the web service account corresponding to the particular portion (block 710). For instance, if portion 308(3) of FIG. 3 is selected then authentication (e.g., signing-in) to the associated account Cathy@serviceprovider.com will be initiated. Authentication may be one-click via stored credential information, or clicking the portion may expose a prompt for credentials such as a password input field.

Public Machine Setting

A user may access web services from a variety of private and public locations. A default setting to "remember" user sign-in information (e.g, credentials) for a web service account may be provided on a web service sign-in page. Thus, each client device used to access a user's web service account may remember the user. As previously described a multiuser web service sign-in user interface may thereafter be generated including a portion corresponding to the "remembered" web service account. Because by default a user will be "remembered" on a client device, this could pose a security threat in publicly used computer setting, such as in a kiosk, computer lab, or computer otherwise shared with others who are not trusted.

Accordingly, in exemplary implementations, techniques are described for persistent public machine setting. A user of a client device may set the client device as a public machine which will disable the "remember" features on the client device for all users. Further, any user's sign-in, credential data and customized information currently stored for the client device will be cleared. Accordingly, the previously described multi-user web based sign in user interface would be disabled on the particular client device as well. The public machine setting will persist (remain until changed) and could be reversed at a future time.

In the following discussion, techniques operable to employ persistent public machine setting techniques within the previously described environment of FIGS. 1-2 are first described. Exemplary procedures are then described which may be employed by the exemplary environment, as well as in other environments. Reference may be made to the previously described multiuser web service sign-in techniques in the course of the discussion.

Figure 8:
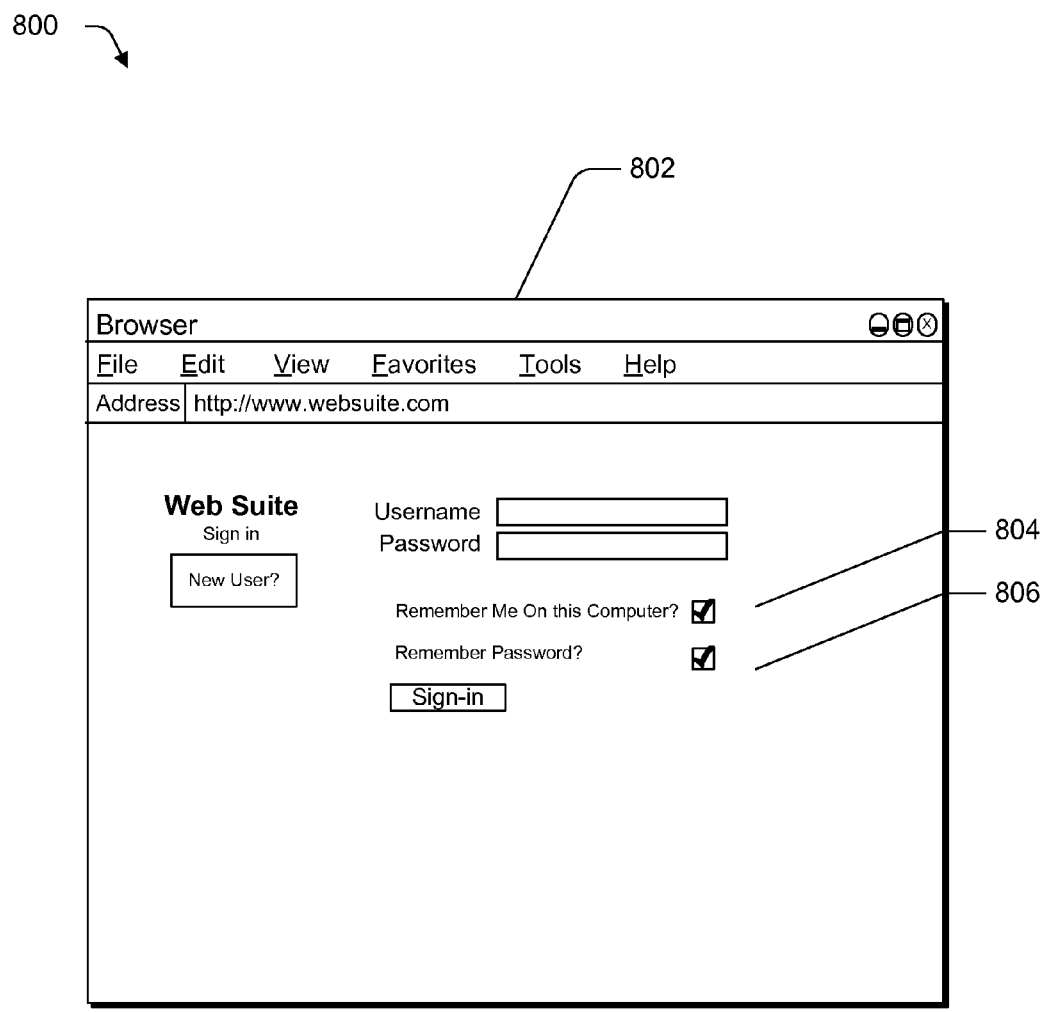
FIG. 8 depicts an exemplary implementation of a user interface configured for sign-in to a web service provider having a default setting to remember user account information.

FIG. 8 depicts an exemplary implementation 800 of a user interface configured for sign-in to a web service provider having a default setting to remember user account information. The user interface 802 may for instance be generated by the previously described communication module 118(n) of FIG. 2. User interface may be output on a client device 104(n). More particularly, the interface may be displayed to permit a user 108 who has not previously accessed an account on the client device to sign-in. For example, a user 108 using a client device 104 for the first time may initially be presented with an interface 402 as depicted in FIG. 4. Upon selection of the unlisted account option 412 the interface 802 may be output. User Interface 802 includes a "remember me" option 804 which is selected by default. User 108 may input credential information (e.g., username and password) via interface 802 to access a web service account. Selecting the "remember me" option 804 causes user account information to be remembered on the client device. Subsequently, the interface 402 initially presented for sign-in will include a portion 308 corresponding to the user.

Figure 9:
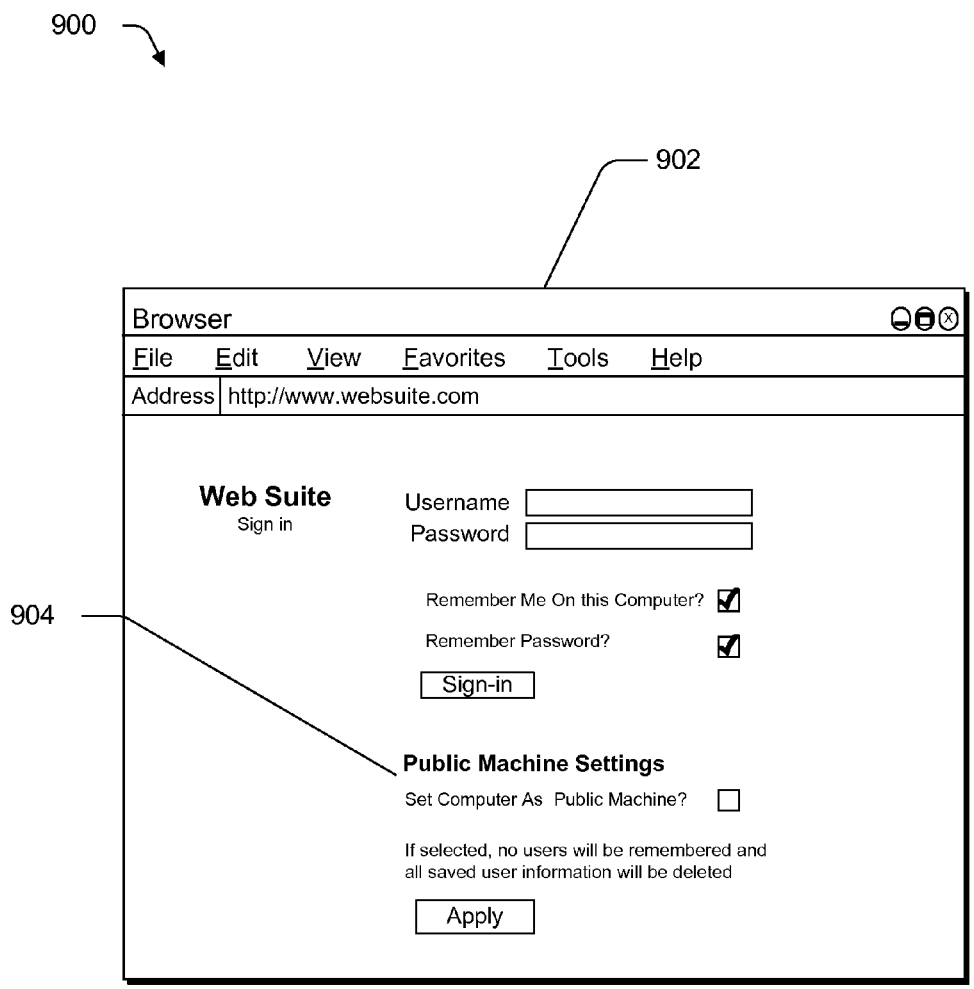
FIG. 9 depicts an exemplary implementation of a user interface configured for sign-in to a web service provider having a portion selectable to designate a machine as a public machine

FIG. 9 depicts an exemplary implementation 900 of a user interface configured for sign-in to a web service provider having a portion selectable to designate a machine as a public machine. The user interface 902 may for instance be generated by the previously described communication module 118(n) of FIG. 2. A user 108 who has not previously saved account information on a client device, such as client device 104(n) depicted in FIG. 2 may be presented with interface 902 to sign-in. In this instance, interface 902 includes a public machine settings 904 portion operable to designate a client device 104(n) as a public machine. The portion 904 may be configured in a variety of ways such as a checkbox, a button, a toggle, text, combinations of various controls and so forth. In the implementation depicted in FIG. 9 for example, public machine settings 904 portion includes a check box which a user may select and an apply button which is selectable to cause the public machine setting to take effect. Further, textual information may be provided to explain the public machine settings. It should be appreciated that a variety of other arrangements of a public machine settings 904 portion may be used without departing from the spirit or scope thereof.

Figure 10:
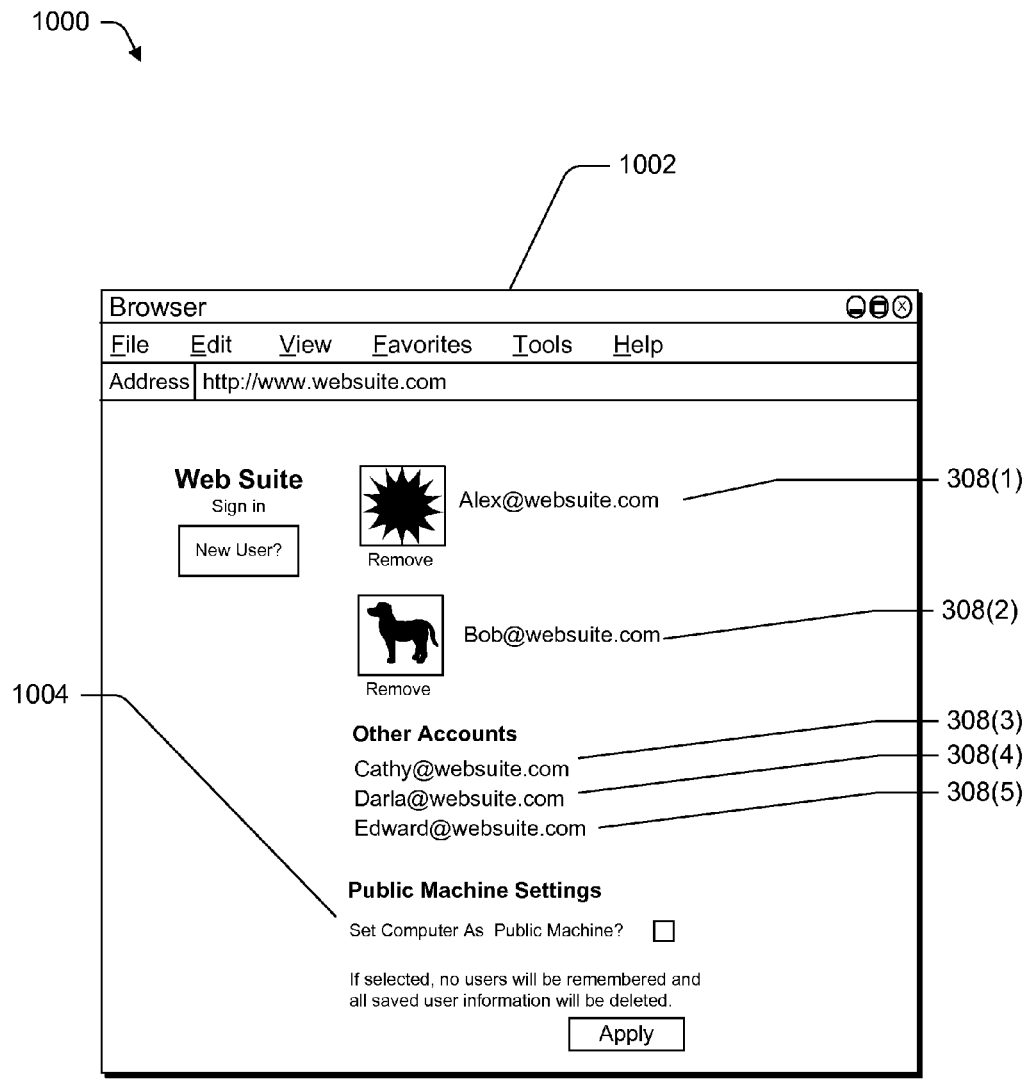
FIG. 10 depicts an exemplary implementation of a user interface configured for multi-user web service sign-in and having a portion selectable to designate a machine as a public machine

FIG. 10 depicts an exemplary implementation 1000 depicting a user interface configured for multiuser web service sign-in and having a portion selectable to designate a machine as a public machine User Interface 1002 includes a plurality of portions 308(1)-308(5) each corresponding to a respective web service account and selectable to access the corresponding account in accordance with the previously described multiuser web service sign-in techniques. Interface 1002 also includes a public machine settings portion 904 operable to designate a client device as a public machine. The public machine settings portion 904 may be configured in a variety of ways as previously discussed in regard to FIG. 9. Thus, interface 1002 and in particular public machine settings 904 portion may be used on a client device 104 having a plurality of stored accounts to designate the client device 104 as a public machine.

In an implementation, any user 108 of a client device 104 may designate the client device 104 as a public machine using the described techniques. No permission or privileged access is required. In this manner, users 108 who access web services in public locations or using shared devices may protect their personal information and accounts.

As indicated, a client device 104(n) may be designated a public machine for example by selecting public machine portion 904 of FIGS. 9 and 10. The public machine designation is persistent, meaning the particular client device 104(n) will remain designated as a public machine for a period of time until the public machine settings is reversed. Designating a client device 104(n) as a public machine also causes the remember features, e.g., remember me 804 and remember password 806 described in relation to FIG. 8, to be disabled on the client device 104(n). Further, selecting the public machine setting will cause any user's account, customized information's, credentials and so forth stored for the client device 104(n) to be cleared. In particular the data will no longer be available for generating multiuser web service sign-in interfaces previously described. It is noted that the public machine setting may be effective for interaction between a particular client device 104(n) and one or more of the plurality of service providers 102 discussed in relation to FIGS. 1 and 2. In other words, setting a client device 104(n) as a public machine while interacting with one particular service provider 102 may be effective just for that particular service provider, or alternatively may apply to a plurality of service providers accessible to the client 104 via network 106.

The clearing of remembered user's accounts and data may be accomplished in a variety of ways, such as by deleting one or more BRO 120 storing the data, by eliminating information referencing accounts 122 from a client device 104 or BROs 120 associated with the client device 104, by removing references to remotely stored accounts 122 and data, and so forth. It is noted that a user 108 may have account 122, authentication 226, and customized user data 130 "remembered" for a number of client devices 104 for example a computer at home and at work. In an implementation, information associated with the user 108 may be commonly stored for a plurality of devices 104 in a remote location accessible via network 106 to each client such as at a service provider server 202, authentication server 216 and so forth. In this instance, setting one device 104(n) as a public machine does not necessarily eliminate the commonly stored information or cause other client devices 104 to be designated as public machines. Rather, the information referencing the commonly stored data, such as in a BRO 120 associated with a particular client device 104(n) is updated or cleared. For instance, references maintained in a BRO 120 on client device 104(n) to a plurality of accounts 122 may be removed from the BRO 120 upon designation of the client device 104(n) as a public machine. However, the actual account information (e.g., customized icons, tiles and so forth) remains remotely stored and accessible via network 106 for use with other devices. In another instance, one or more BRO 120 actually storing a plurality of account information may be deleted. In this manner, any locally stored account information and any links or references to remotely stored data may be eliminated using the public machine setting techniques described.

The persistent public machine designation may occur in a variety of ways. For instance, upon selection of machine setting 904 a BRO 120 associated with a particular client device 104(n) maybe utilized store the public machine setting. When communication module 118(n) of a client device 104(n) is directed to service provider 102(m), the BRO 120 may be utilized to determine if the client is designated as a public machine. In particular, communication module 118(n) may be configured to retrieve a public machine setting from a BRO 120 located locally on client device 104(n) or accessible via network 106.

Figure 11:
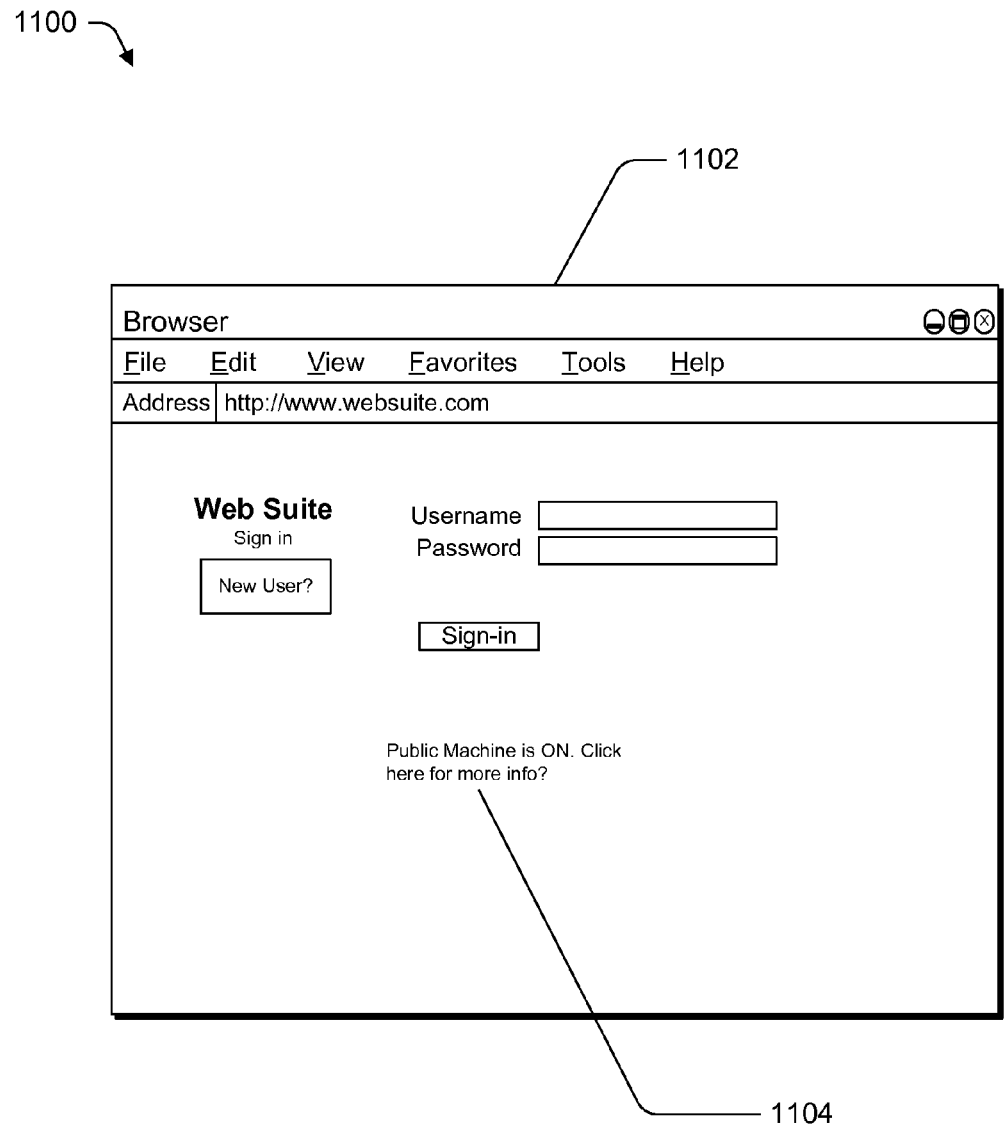
FIG. 11 depicts an exemplary implementation depicting a user interface on a designated public machine having a portion indicating the public machine setting and selectable to toggle the public machine setting.

The user interface generated by 118(n) may depend upon the public machine setting. For example, if no user information has been saved for a client device 104(n) and the client device 104(n) has not been designated a public machine, a user interface such as 902 in FIG. 9 may be output. If a plurality of accounts have been saved for the client device 104 and the client device 104(n) has not been designated a user interface such as 1002 in FIG. 10 may be output. If the client device 104(n) has been designated as a public machine, then unless the public machine designation is toggled or reversed remember options on the client device 104(n) will be disabled and storing of account information for the client device will be prevented. The following discussion of FIG. 11 describes an exemplary interface that may be output when a client device 104(n) has been designated as a public machine FIG. 11 depicts an exemplary implementation 1100 depicting a user interface on a designated public machine having a portion indicating the public machine setting and selectable to toggle the public machine setting. In an implementation, applying the public machine setting discussed with respect to FIGS. 9 and 10 causes the stored user account information to be eliminated. Thus, subsequently a user interface without stored user information such as depicted in FIG. 11 will be output for sign-in to web services on the client device 104. It is noted that in FIG. 11 the remember me 804 and remember password 806 options discussed in regard to FIG. 8 have been disabled in FIG. 11. In the FIG. 11 for instance those remember options do not appear. A public machine indication 1104 may be provided to alert users 108 that the machine has been designated as public and accordingly that the multiuser web service sign-in and remember features are disabled. The portion 1104 may be selectable to toggle the public machine setting. In other words, the portion 1104 may provide an option to reverse the public machine setting, and thereafter allow remembered user account information, multiuser web service sign-in, and so forth.

Exemplary Procedures

FIG. 12 depicts a procedure 1200 in an exemplary implementation in which a user interface is output having a portion selectable to designated a client device as a public machine. A user interface is output having a portion selectable to designate a client device as a public machine (block 1202). For example, a multi-user web based sign-in interface 1002 as depicted in FIG. 10 may be output when a browser of a client device 104(n) of FIG. 2 is directed to a service provider 102(m). The interface provides customized user data 130 in portions 308 corresponding to a plurality of users 108(p) prior to those users 108(p) signing-in to accounts 122 with service provider 102(m). In addition, a portion 904 is included which is selectable to cause the client device 104(n) to be designated as a public machine.

Upon selection of the portion, a plurality of user web service account descriptions stored for the client device are removed (block 1204). For instance, the user interface 1002 of the previous example may be generated using one or more BRO 120 which stores description of accounts access via client device 104(n). In particular, the one or more BROs 120 store data associated with accounts at websuite.com for Alex, Bob, Cathy, Darla and Edward. The stored data in the BROs 120 may include customized user data 130, such as the sun and dog user tiles associated with Alex and Bob, or may indicate a location accessible to client 104 where such customized user data 130 may be retrieved. The output interface 1002 accordingly has customized sign-in portions 308 for each user 108(p). When the public machine setting 904 portion is selected, the client 104(n) may be designated as a public machine. The data describing the accounts 122 in the BROs 120 may be removed, e.g., delete or overwrite the descriptions in the BROs 120. Alternatively, selecting the public machine setting 904 portion may cause the one or more BROs may be deleted. Thus, the data used to generate multiuser web service sign-in interface 1002 is no longer accessible to client device 104(n).

A public machine designation is stored in a browser readable object associated with the client device (block 1206). For example, a BRO 120 as depicted in memory 210(n) of client device 104(n) in FIG. 1 may be updated to include a public machine designation. In one instance, the BRO 120 will be generated at the time the public machine setting 904 is selected. Naturally, BRO may be located on client device 104(n) or may be accessible to the client device 104(n) via network 106. Subsequently, when a browser, for example a browser incorporated within communication module 118(n) is directed to service provider 102(m), browser may be configured to access the BRO 120 and determine that the client device has been designated as a public machine Thus, remember options on the client 104(n) will be disabled and storing of account information for the client device 104(n) will be prevented.

Figure 13:
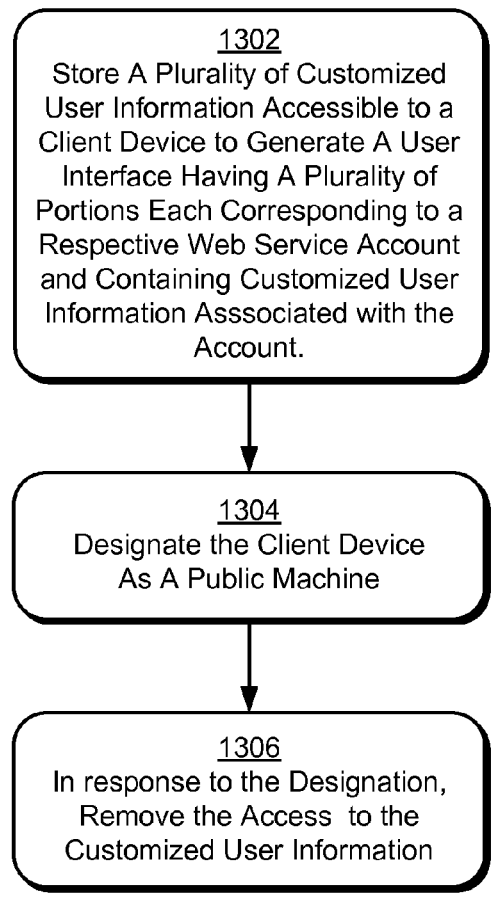
FIG. 13 depicts a procedure in an exemplary implementation in which account information corresponding to a plurality of web service accounts stored for a client device is deleted in response to designation of the client device as a public machine.

FIG. 13 depicts a procedure 1300 in an exemplary implementation in which account information corresponding to a plurality of web service accounts stored for a client device is deleted in response to designation of the client device as a public machine. A plurality of customized user information is stored which is accessible to a client device to generate a user interface having a plurality of portions each corresponding to a respective web service account and containing customized user information associated with the account (block 1302). For example, server 202(x) of FIG. 2 is depicted having a plurality of accounts 122(m) which may include corresponding customized user data 130 as shown in FIG. 1. In another example, an authentication service 216 may store customized user information 130 as depicted in memory 222 of FIG. 2. A client device 104 (n) may have access to the data via network 106. For instance, a BRO 120 may describe which accounts 122(m) and which customized user data 130 to include in a rendering of a user interface 116'. In another implementation a BRO located on the client 104(n) may directly store the customized user data 130. Communication module 118(n) of FIG. 2 may be configured to generate user interface 116' using information from and/or data identified in one or more BRO 120. Thus, using the techniques previously described, the stored customized user data 130 may be utilized to generate a user interface as depicted in FIGS. 3-6 for instance.

A client device is designated as a public (block 1304). In one example, client device 104(n) may be designated as a public machine via a user interface having a public machine setting portion 904 described in relation to FIGS. 9-10. A variety of other ways of designating a client device as a public machine are also contemplated, such as via a operating system control panel, by accessing settings of an application module such as communication module 118(n), via browser preferences, by settings in an security program on the client device, and so on. As previously described, designating a client device as a public machine may disable remember features and prevent storing of account information for the client device 104(n).

In response to the designation, access to the customized user information stored for the client device is removed (block 1306). Removing access may include deleting information and/or deleting references or links to information. For instance, one or more BRO 120 of the previous example describing which accounts 122(m) and which customized user data 130 to include in a user interface may be deleted, overwritten, modified and so forth to prevent access to information previously available to a communication module 118(n) to render a user interface. Further, communication module 118(n) may be configured to maintain the public machine designation and accordingly will prevent access to any user's customized information remotely stored for use with a plurality of client devices 104.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
outputting, on a client device, a user interface having a selectable option;
in response to acceptance of the selectable option and receiving, via the user interface, credential information to access individual ones of a plurality of web service provider user accounts, causing storage of user account information associated with the individual ones of the plurality of web service provider user accounts; and
unless the selectable option is disabled, outputting, on the client device, a multiuser web service sign-in user interface having a plurality of portions corresponding to a plurality of users based at least in part on the stored user account information, each portion of the plurality of portions:
corresponding to a respective web service provider user account of the plurality of web service provider user accounts for one of the plurality of users;
including customized user information corresponding to one of the plurality of users; and
being selectable to initiate authentication to access the respective web service provider user account.

2. The method as recited in claim 1, wherein the selectable option is a first selectable option, the user interface further including a second selectable option that, upon acceptance:
designates the client device as a public machine;
disables the first selectable option to clear the stored user account information; and
stores a public machine designation at the client device.

3. The method as recited in claim 2, wherein the public machine designation prevents subsequent user account information from being stored.

4. The method as recited in claim 1, wherein the user account information is stored on the client device.

5. The method as recited in claim 1, wherein the user account information is stored as one or more browser readable objects.

6. A method comprising:
outputting, on a client device, a user interface having a selectable option;
receiving, via the user interface, credential information to access individual ones of service provider user accounts;
if the selectable option is accepted upon the receiving of the credential information, causing storage of information describing the individual ones of the service provider user accounts; and
accessing the stored information to output, on the client device, a multiuser sign-in user interface having a plurality of portions corresponding to the individual ones of the service provider user accounts, each portion of the plurality of portions:
including customized user information associated with a respective service provider user account; and
being selectable to initiate authentication to access the respective service provider user account.

7. The method as recited in claim 6, wherein the information describing the individual ones of the service provider user accounts is stored as one or more browser-readable objects, and wherein the client outputs the multiuser sign-in user interface via a browser using the one or more browser-readable objects.

8. The method as recited in claim 7, wherein the one or more browser-readable objects comprise a single browser-readable object storing the information describing the individual ones of the service provider user accounts.

9. The method as recited in claim 6, wherein the information describing the individual ones of the service provider user accounts is stored locally on the client device, the method further comprising accessing, by the client device, the stored information to determine where to obtain the customized user information.

10. The method as recited in claim 6, wherein the selectable option is a first selectable option, the user interface further including a second selectable option that, upon acceptance:
designates the client device as a public machine;
disables the first selectable option to clear the stored information; and
stores a public machine designation at the client device.

11. The method as recited in claim 10, wherein the public machine designation prevents subsequent information describing service provider user accounts from being stored.

12. The method as recited in claim 6, wherein the customized user information comprises at least one of:
a user tile;
a user name;
an alias;
text;
graphics;
a color selection;
audio;
an image;
animation; or
video.

13. The method as recited in claim 6, further comprising, if the selectable option is accepted upon the receiving of the credential information, storing authentication data on the client device, the authentication data corresponding to the individual ones of the service provider user accounts, wherein each portion of the plurality of portions is selectable to cause communication of respective authentication data to access the respective service provider user account.

14. The method as recited in claim 6, wherein selection of the respective service provider user account initiates access to a suite of services from a service provider associated with the respective service provider user account.

15. One or more computer-readable storage device storing computer executable instruction that, when executed by one or more processors of a client device, cause the client device to:
output a user interface to receive credential information, the user interface having a selectable option;
in response to acceptance of the selectable option and receiving, via the user interface, the credential information to access individual ones of a plurality of service provider user accounts, causing storage of information describing the individual ones of the plurality of service provider user accounts; and
accessing the stored information to output a multiuser sign-in user interface having a first portion corresponding to a first service provider user account and a second portion corresponding to a second service provider user account;
wherein the first portion and the second portion each:
include customized user information corresponding to a user for identification in a multi-user environment; and are selectable to initiate authentication to access services provided by a service provider associated with the plurality of service provider user accounts.

16. The one or more computer-readable storage device as recited in claim 15, wherein the selectable option is a first selectable option, the user interface further including a second selectable option that, upon acceptance:

designates the client device as a public machine;

disables the first selectable option to clear the stored information; and stores a public machine designation at the client device.

17. The one or more computer-readable storage device as recited in claim 16, wherein the public machine designation prevents subsequent information describing the plurality of service provider user accounts from being stored.

18. The one or more computer-readable storage device as recited in claim 15, wherein the information describing the individual ones of the plurality of service provider user accounts is stored on a storage server remotely located from, and accessible by, the client device.

19. The one or more computer-readable storage device as recited in claim 15, wherein the information describing the individual ones of the plurality of service provider user accounts is stored as one or more browser-readable objects on the client device.

20. The one or more computer-readable storage device as recited in claim 15, wherein the services provided by the service provider comprise a suite of services accessible to the user during a session initiated by the authentication.

\* \* \* \* \*